(12) United States Patent
Ziegler

(10) Patent No.: US 9,387,843 B2
(45) Date of Patent: Jul. 12, 2016

(54) METHOD AND DEVICE FOR CONTROLLING THE TRACTION SLIP OF DRIVEN WHEELS OF A VEHICLE WITH THE ENGINE ROTATIONAL SPEED AS MANIPULATED VARIABLE

(75) Inventor: Andreas Ziegler, Weissach (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 2356 days.

(21) Appl. No.: 12/224,060

(22) PCT Filed: Feb. 19, 2007

(86) PCT No.: PCT/EP2007/001403
§ 371 (c)(1),
(2), (4) Date: Apr. 27, 2010

(87) PCT Pub. No.: WO2007/096110
PCT Pub. Date: Aug. 30, 2007

(65) Prior Publication Data
US 2010/0204895 A1    Aug. 12, 2010

(30) Foreign Application Priority Data
Feb. 20, 2006   (DE) .......................... 10 2006 007 740

(51) Int. Cl.
| | |
|---|---|
| *G06F 19/00* | (2011.01) |
| *B60T 8/175* | (2006.01) |
| *B60K 28/16* | (2006.01) |

(52) U.S. Cl.
CPC ................ *B60T 8/175* (2013.01); *B60K 28/16* (2013.01); *B60T 2270/211* (2013.01); *B60W 2510/0638* (2013.01); *B60W 2520/28* (2013.01); *B60W 2540/16* (2013.01); *B60W 2710/0644* (2013.01)

(58) Field of Classification Search
USPC .......................................................... 701/90
See application file for complete search history.

(56) References Cited

U.S. PATENT DOCUMENTS

| | | | |
|---|---|---|---|
| 5,119,299 A | 6/1992 | Tamura et al. | |
| 6,321,154 B1 | 11/2001 | Schmitt et al. | |

(Continued)

FOREIGN PATENT DOCUMENTS

| | | |
|---|---|---|
| DE | 196 44 231 | 8/2000 |
| DE | 198 37 521 | 10/2000 |

(Continued)

OTHER PUBLICATIONS

International Search Report of PCT/EP2007/001403 dated Jun. 4, 2007.

(Continued)

*Primary Examiner* — Mussa A Shaawat
*Assistant Examiner* — Kyung Kim
(74) *Attorney, Agent, or Firm* — Kenyon & Kenyon LLP

(57) ABSTRACT

A method for controlling the traction slip of driven wheels of a vehicle between the wheels and the carriageway, in the case of which a manipulated variable is calculated for a drive engine of the vehicle on the basis of a detection of the instantaneous wheel speed and the calculation of a desired wheel speed, the manipulated variable being formed by an upper limit value for the rotational speed of the drive engine, characterized in that the instantaneous transmission ratio is calculated on the basis of the instantaneous rotational speed of the drive engine and the instantaneous wheel speed, and the upper limit value for the rotational speed of the drive engine is calculated from the desired wheel speed and the instantaneous transmission ratio.

11 Claims, 2 Drawing Sheets

(56) References Cited

U.S. PATENT DOCUMENTS 6,493,622 B1    12/2002    Erban
2003/0216850 A1*   11/2003    Trefzer et al. .................. 701/82

FOREIGN PATENT DOCUMENTS

| | | |
|---|---|---|
| DE | 199 50 035 | 10/2000 |
| EP | 1 147 937 | 10/2001 |
| WO | WO 01/28802 | 4/2001 |

OTHER PUBLICATIONS

European Patent Office, Translation of International Preliminary Report on Patentability, Dec. 24, 2008, from International Patent Application No. PCT/EP2007/001403, filed on Feb. 19, 2007.

* cited by examiner

//METHOD AND DEVICE FOR CONTROLLING THE TRACTION SLIP OF DRIVEN WHEELS OF A VEHICLE WITH THE ENGINE ROTATIONAL SPEED AS MANIPULATED VARIABLE

FIELD OF THE INVENTION

The present invention relates to a method and a device for controlling the traction slip of driven wheels of a vehicle.

BACKGROUND INFORMATION

When starting up or accelerating, the force transmission depends on the slip between tire and carriageway. This dependence can be represented in adherence-slip curves. In the case of small slip values, the acceleration processes proceed in the stable region, while if the slip increases there is also an increase in the useful adherence, that is to say the coefficient of static friction. With increasing slip beyond the achievable maximum adherence, the unstable region of the slip curve is reached because further increase in the slip leads to a reduction in the adherence.

In order to adapt the traction slip to permissible values, use is made of traction slip regulators (ASR) that, firstly, regulate the drive torque of the drive engine and, in addition, activate the brake system of the vehicle. Electronic brake systems (EBSs) of modern utility vehicles, in which ABS systems are also integrated, therefore have brake control units with a functional part for regulating traction slip.

FIG. 1 shows schematically the design of a control loop 10 for controlling the drive torque of a drive engine 12 of a utility vehicle. In this case, wheel rotational speed sensors are used to measure the wheel rotational speeds of the driven wheels, present at an end of a drive train 14, and corresponding signals are fed into a brake control unit 16 with integrated functional part for the purpose of traction slip control ASR. This brake control unit 16 is, by way of example, connected via a CAN interface 18 according to SAE J1939 to an engine control unit 20 that activates the drive engine 12. Via the interface 18, it is then possible for the brake control unit 16 to supply a desired value for the drive torque of the drive engine 12 to the engine control unit 20.

FIG. 2 shows the design principle of the control structure of the engine torque control within the traction slip control. In this case, a desired value is firstly calculated for the wheel speed from the instantaneous wheel speed of a driven wheel, the instantaneous vehicle speed, and a permissible traction slip. This desired value is compared with the actual value of the instantaneous wheel speed, and the speed control deviation is determined. The desired value for the drive torque of the drive engine 12 is calculated by the brake control unit 16 with the aid of an electronic controller as a function of this speed control deviation. It is therefore an essential feature of this control that the manipulated variable calculated by the controller is a desired drive torque for the drive engine 12, whereas the wheel speeds of the driven wheels are used as input variables. However, since there are further, subordinate control loops that influence the drive torque of the drive engine 12, this prescription of desired values is often not implemented identically in the engine control unit 20.

The German patent document DE 198 37 521 A1 discusses a method and a device for traction slip control in the case of which a switchover is made to engine rotational speed desired control in the run-up of a traction control. However, the document includes no accurate details on how such a control is to be implemented.

The aim of the method in WO 01/28802 is the avoidance of damage to differential gears or tires owing to excessively large differences in rotational speed between the driven wheels of an axle. By contrast with traction slip control on which the exemplary embodiments and/or exemplary methods of the present invention is based, a substantial difference resides in the fact that the aim of the known method is to limit the relative traction slip (wheel speed difference between the wheels of the front axle and the rear axle) between driven wheels of a vehicle to a prescribed value while, however, in the case of traction slip controls the absolute traction slip of the driven wheels, that is to say the slip between wheel and street, is controlled to an optimum value in order to be able to start up or accelerate with the best adherence between wheel and carriageway.

SUMMARY OF THE INVENTION

It is therefore an object of the exemplary embodiments and/or exemplary methods of the present invention to further develop a method and a device of the type mentioned at the beginning in such a way that for the purpose of traction slip control the engine rotational speed control can be implemented simply and operates accurately.

This object may be achieved according to the exemplary embodiments and/or exemplary methods of the present invention by the features described herein.

Since traction slip controls (ASRs) control a slip and thus wheel rotational speeds, and said wheel rotational speeds are proportional to the rotational speed of the drive engine, instead of the desired drive torque, the exemplary embodiments and/or exemplary methods of the present invention uses an upper limit rotational speed of the drive engine as manipulated variable. Here, upper limit rotational speed means that up to this limit rotational speed the vehicle is operated in the stable region of the adherence-slip curve or at the adherence maximum, while in the case of rotational speeds that go beyond the upper limit rotational speed the unstable region of the adherence-slip curve is reached. To this extent, the upper limit rotational speed constitutes a desired rotational speed value of the drive engine.

The engine rotational speed controller implemented in each engine control unit can control a prescribed rotational speed substantially more quickly and accurately than is possible by a prescribed drive torque. Consequently, in the control of traction slip, the exemplary embodiments and/or exemplary methods of the present invention avoids the detour via the control of the drive torque as manipulated variable, thus eliminating a controller and the outlay on application, required for this controller, for the purpose of tuning the controller response with respect to the vehicle or the drive engine.

By contrast, in order to control the traction slip it is possible to make exclusive use of rotational speed controllers that are present in any case in the engine control units and are tuned to the respective drive engine. This yields a simpler structure and an improved controller response. Furthermore, mutual influence exerted by various controllers acting on the drive torque as manipulated variable is avoided. Not least, the data transfer for transmitting the signal for the maximum permissible engine rotational speed between the brake control unit and the engine control unit can be performed via the CAN interface according to SAE J1939 already mentioned at the beginning.

A first step is to calculate the instantaneous transmission ratio on the basis of the instantaneous rotational speed of the drive engine and the instantaneous wheel speed. The upper limit value for the rotational speed of the drive engine can then be calculated from the desired wheel speed and the instantaneous transmission ratio.

A more accurate account emerges from the following description of an exemplary embodiment.

An exemplary embodiment of the invention is illustrated below in the drawing and explained in more detail in the following description.

DETAILED DESCRIPTION

Figure 1:
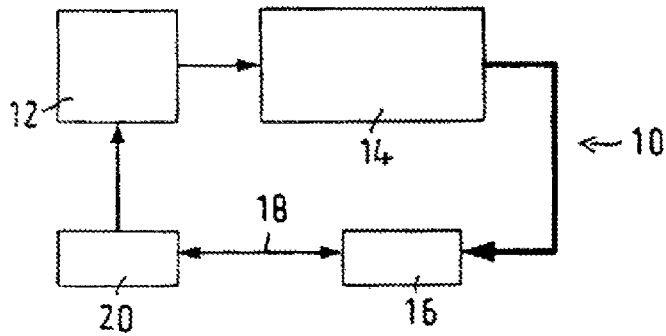
FIG. 1 shows a control loop for controlling the drive torque.
Figure 2:
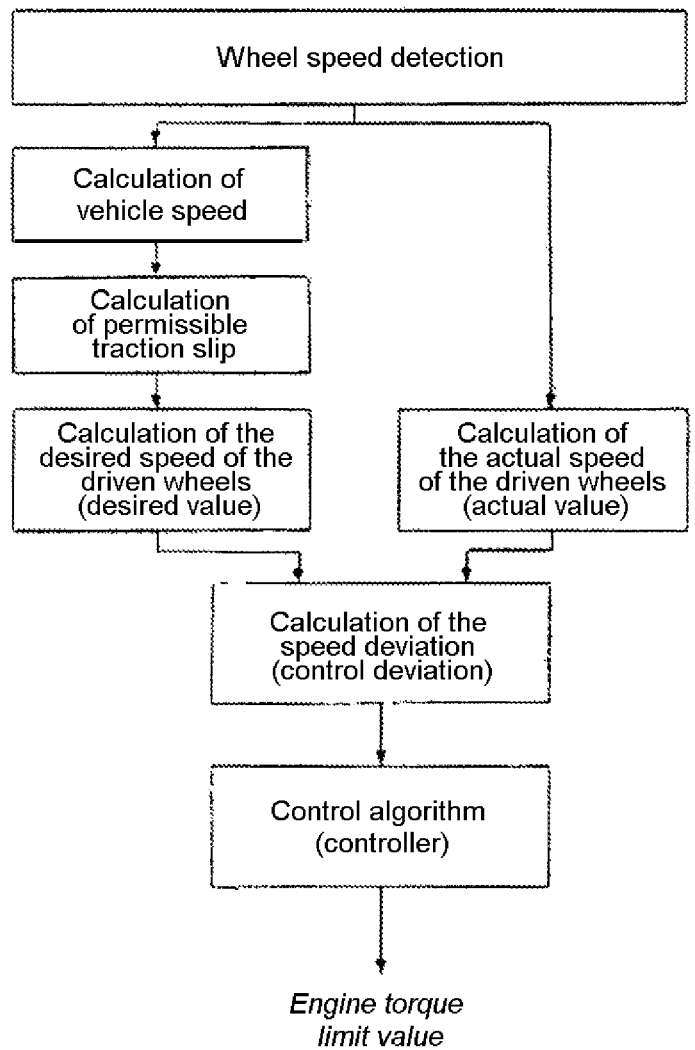
FIG. 2 shows a control structure of the engine torque control within a traction slip control.

The control loop 10, shown in FIG. 1, for controlling the drive torque is also valid in principle for a traction slip control ASR in accordance with the exemplary embodiments and/or exemplary methods of the present invention by engine rotational speed control, with the difference that in accordance with the exemplary embodiments and/or exemplary methods of the present invention, it is not the drive torque of the drive engine 12 that is used as manipulated variable of the control loop 10, but a permissible upper limit rotational speed of the drive engine 12, this being done as a function of the slip present at the respective drive wheel or at a number of drive wheels. The traction slip control may be implemented inside an electronic brake system of a utility vehicle and, in addition to the drive engine 12, also influences the brake system thereof. Since the latter function is not essential to the exemplary embodiments and/or exemplary methods of the present invention, it will not be examined below.

In detail, the drive engine 12 acts on the drive train 14, which consists, for example, of a gearbox, a drive train, a transfer gear, the respective drive shafts and the driven wheels assigned to a driven axle. In this case, the utility vehicle can be driven at one or two axles. The driven and nondriver wheels are assigned wheel speed sensors that input signals for the instantaneous wheel speed into the brake control unit 16, in which, for example, routines for an additionally present ABS control and/or for an electronic stability program (ESP) are also running.

Moreover, the brake control unit 16 is provided with an integrated functional part for traction slip control, which is, for example, connected to the engine control unit 20 via a CAN interface 18 according to SAE J1939. Said engine control unit 20 in turn controls power, torque and rotational speed of the drive engine 12 and, in particular, includes an engine rotational speed controller that is present in any case for other tasks.

Figure 3:
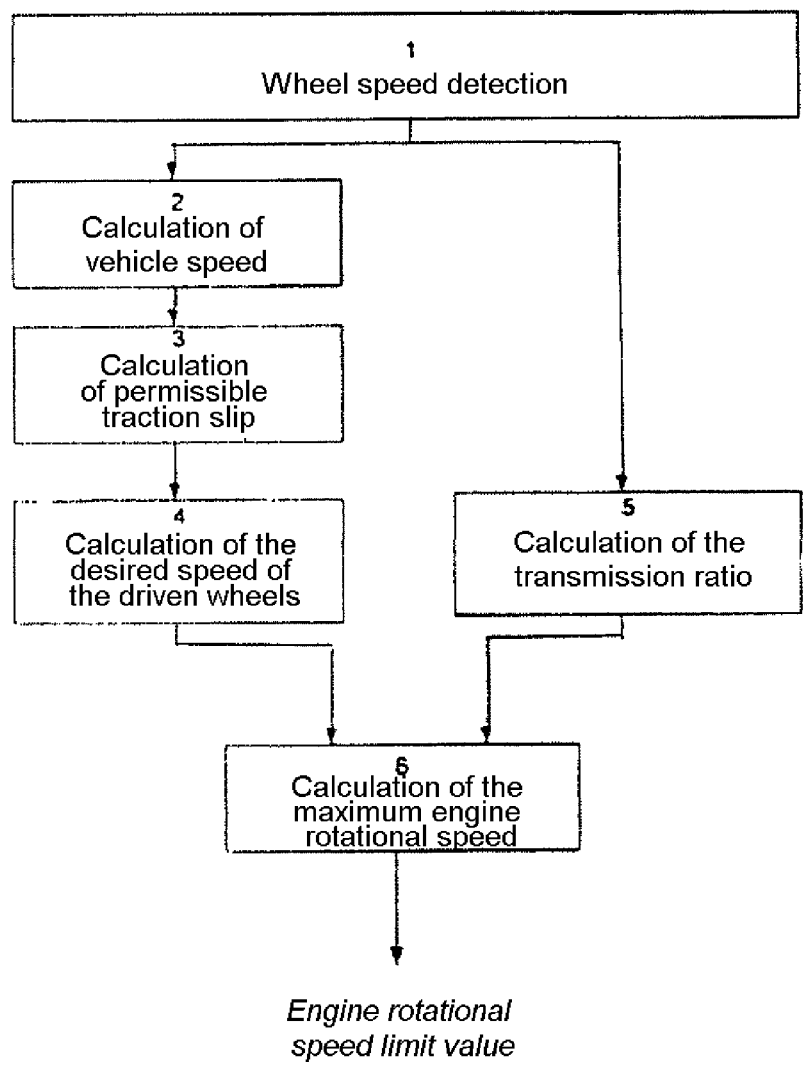
FIG. 3 shows the control structure of an engine rotational speed control inside a traction slip control in accordance with an exemplary embodiment of the present invention.

FIG. 3 shows the design principle of the control structure of the engine rotational speed control, the instantaneous wheel speed present at the respective driven wheel representing the input variable that, in accordance with the functional block 1, is detected by the wheel speed sensors. Furthermore, the instantaneous engine rotational speed is also measured in a known way.

The instantaneous transmission ratio i_total is then calculated as follows from the wheel speeds of the driven wheels and the current engine rotational speed in the functional block 5:

$$i\_total = n\_mot/((v\_2l + v\_2r)/2),$$

n_mot: being the instantaneous engine rotational speed, and v_2r, v_2l being the instantaneous wheel speeds of the driven wheels of a driven axle.

This type of calculation by way of an averaging can also be carried over to a number of driven axles. In the case of a utility vehicle having two driven axles or four driven wheels, it holds for the instantaneous transmission ratio i_total, for example, that:

$$i\_total = n\_mot/((v\_2l + v\_2r + v\_3l + v\_3r)/4),$$

n_mot: being the instantaneous engine rotational speed, and v_2r, v_2l, v_3l, v_3r being the instantaneous wheel speeds of the driven wheels of two driven axles.

The functions carried out in blocks 2 to 4 are already known from the prior art and relate to the calculation of the instantaneous vehicle speed in block 2, for example from the signals of the wheel rotational speed sensors of nondriver axles. This variable and the wheel rotational speeds of the driven wheels can then be used to calculate the instantaneous slip of the driven wheels during an acceleration process. In accordance with block 3, the admissible or optimum traction slip is determined, for example, from stored adhesion-slip characteristics, which also yield the desired wheel speeds of the driven wheels in accordance with block 4.

The desired wheel speed calculated in block 4, and the transmission ratio i_total calculated in block 5 are then finally used in block 6 to calculate an upper limit value n_mot_max for the engine rotational speed, as follows:

$$n\_mot\_max = v\_soll * i\_total.$$

If the drive engine were driven with a rotational speed above the upper limit value n_mot_max, the slip would be increased and the adhesion would thereby fall, while stable driving is enabled by operating the drive engine at rotational speeds lower than this, and driving with maximum adhesion is enabled by operation of the drive engine at the upper limit value n_mot_max. The upper limit value n_mot_max therefore forms the desired rotational speed value for the engine rotational speed controller integrated in the engine control unit 20, and is transmitted via the CAN interface 18.

Subsequently, the control deviation between the upper limit value n_mot_max and the actual engine rotational speed is calculated by the rotational speed controller 20. The desired rotational speed value is then controlled in the case of a spark-ignition internal combustion engine by, for example, an actuator acting on the throttle valve and, in the case of a compression ignition internal combustion engine by an actuator acting on the diesel injection pump, the respective actuator being triggered by the rotational speed controller 20.

A LIST OF REFERENCE NUMERALS IS AS FOLLOWS:

10 Control loop
12 Drive engine
14 Drive train
16 Brake control unit
18 Interface
20 Engine control unit

The invention claimed is:

1. A method for controlling a traction slip of driven wheels of a vehicle between the wheels and the carriageway, the method comprising:
determining a manipulated variable for a drive engine of the vehicle based on a detection of an instantaneous wheel speed and a determination of a desired wheel speed, the manipulated variable being formed by an upper limit value for the rotational speed of the drive engine of the vehicle;

determining an instantaneous transmission ratio based on an instantaneous rotational speed of the drive engine and an instantaneous wheel speed; and determining the upper limit value for the rotational speed of the drive engine from the desired wheel speed and the instantaneous transmission ratio;

wherein the manipulated variable is a rotational speed of the drive engine, and wherein the upper limit for the rotational speed is the limit at which the vehicle is operated in a stable region of an adherence-slip curve or at an adherence maximum, wherein an engine control unit has a rotational speed controller that regulates the drive engine to the upper limit value for the rotational speed, wherein the instantaneous transmission ratio i_total is determined from the instantaneous wheel speeds of the driven wheels and the current engine rotational speed n_mot as follows: $i\_total = n\_mot/((v\_2l + v\_2r)/2)$, where n_mot is the instantaneous engine rotational speed, and $v\_2r$, $v\_2l$ are the instantaneous wheel speeds of the driven wheels of a driven axle, and wherein the desired wheel speed v_soll and the transmission ratio i_total are used to determine the upper limit value for the engine rotational speed n_mot_max, as follows:

$$n\_mot\_\max = v\_soll * i\_total.$$

2. The method of claim 1, wherein the desired wheel speed is calculated from the instantaneous vehicle speed and a permissible traction slip value.

3. The method of claim 1, wherein the method is performed using at least one control unit which is a control unit of one of an electronic brake system (EBS) and an anti-lock brake system (ABS).

4. The method of claim 3, wherein the upper limit value for the rotational speed is fed into the engine control unit by the control unit via a controller area network (CAN) interface.

5. The method of claim 4, wherein at least one control unit calculates the upper limit value for the rotational speed of the drive engine from the desired wheel speed and the instantaneous transmission ratio.

6. The method of claim 1, wherein at least one control unit is a control unit of one of an electronic brake system (EBS) and an anti-lock brake system (ABS), wherein the upper limit value for the rotational speed is fed into the engine control unit by the control unit via a controller area network (CAN) interface, and wherein the at least one control unit calculates the upper limit value for the rotational speed of the drive engine from the desired wheel speed and the instantaneous transmission ratio.

7. A device for controlling a traction slip of driven wheels of a vehicle, comprising:

at least one control unit to determine a manipulated variable for a drive engine of the vehicle based on a detection of an instantaneous wheel speed and a determination of a desired wheel speed, the manipulated variable being formed by an upper limit value for the rotational speed of the drive engine;

wherein the at least one control unit determines the instantaneous transmission ratio based on an instantaneous rotational speed of the drive engine and the instantaneous wheel speed, and determines the upper limit value for the rotational speed of the drive engine from the desired wheel speed and an instantaneous transmission ratio;

wherein the manipulated variable is a rotational speed of the drive engine, and wherein the upper limit for the rotational speed is the limit at which the vehicle is operated in a stable region of an adherence-slip curve or at an adherence maximum, and wherein an engine control unit has a rotational speed controller that regulates the drive engine to the upper limit value for the rotational speed, wherein an engine control unit has a rotational speed controller that regulates the drive engine to the upper limit value for the rotational speed, wherein the instantaneous transmission ratio i_total is determined from the instantaneous wheel speeds of the driven wheels and the current engine rotational speed n_mot as follows: $i\_total = n\_mot/((v\_2l + v\_2r)/2)$, where n_mot is the instantaneous engine rotational speed, and $v\_2r$, $v\_2l$ are the instantaneous wheel speeds of the driven wheels of a driven axle, and wherein the desired wheel speed v_soll and the transmission ratio i_total are used to determine the upper limit value for the engine rotational speed n_mot_max, as follows:

$$n\_mot\_\max = v\_soll * i\_total.$$

8. The device of claim 7, wherein the at least one control unit is a control unit of one of an electronic brake system (EBS) and an anti-lock brake system (ABS).

9. The device of claim 7, wherein the upper limit value for the rotational speed is fed into the engine control unit by a control unit via a controller area network (CAN) interface.

10. The device of claim 9, wherein the at least one control unit calculates the upper limit value for the rotational speed of the drive engine from the desired wheel speed and the instantaneous transmission ratio.

11. The device of claim 7, wherein the at least one control unit is a control unit of one of an electronic brake system (EBS) and an anti-lock brake system (ABS), wherein the upper limit value for the rotational speed is fed into the engine control unit by the control unit via a controller area network (CAN) interface, and wherein the at least one control unit calculates the upper limit value for the rotational speed of the drive engine from the desired wheel speed and the instantaneous transmission ratio.

* * * * *